Feb. 7, 1928.

J. H. TEWES 1,658,500

COMBINED TRAILER AND BOAT

Filed Jan. 16, 1926    2 Sheets-Sheet 1

Inventor
John H. Tewes
By his Attorneys
Prindle, Wright, Neal & Bean

Feb. 7, 1928.　　　　　　　　　　　　　　　　1,658,500
J. H. TEWES
COMBINED TRAILER AND BOAT.
Filed Jan. 16, 1926　　　　2 Sheets-Sheet 2
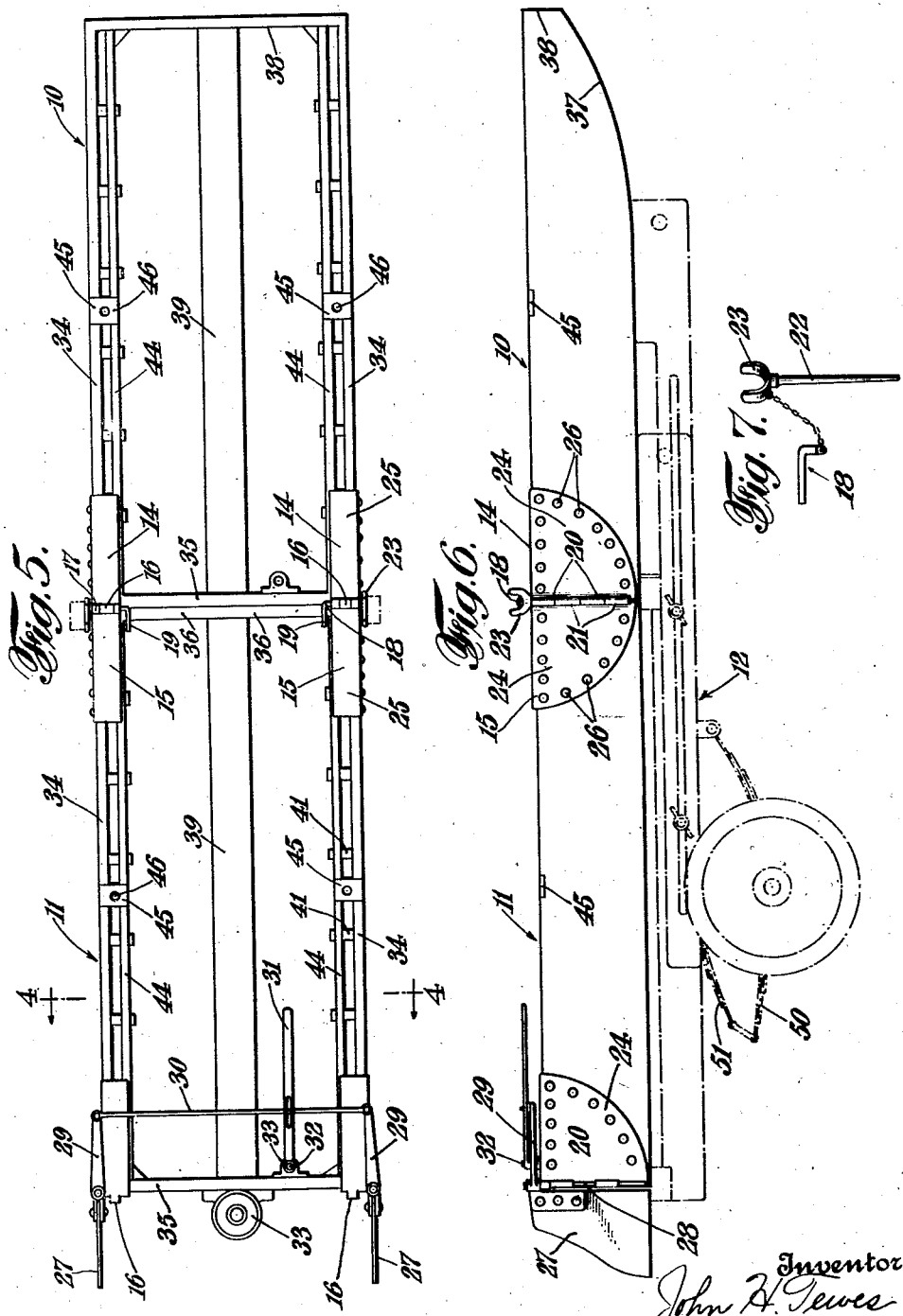

Patented Feb. 7, 1928.

1,658,500

UNITED STATES PATENT OFFICE.

JOHN H. TEWES, OF BROOKLYN, NEW YORK.

COMBINED TRAILER AND BOAT.

Application filed January 16, 1926. Serial No. 81,663.

This invention relates to a trailer and the general object is to provide such a device adapted to be used to carry camping necessities to the camping ground and then to be used as a boat.

Many persons who now own automobiles, very much desire some sort of device which will make it possible for them to go on pleasure trips and conveniently carry enough equipment so that they will be enabled to camp wherever they please by the side of a body of water and have the use of one or more boats while thus camping. The trailer described in the following specification and illustrated in the accompanying drawings is designed to provide a device to meet the demands of such persons.

One of the objects of the invention therefore, is to provide a trailer of the type specified which includes two complete detachably connected boat sections, each large enough to support at least one person so that the trailer may be used to provide more than one boat.

A further object of the invention is to provide a trailer of the above mentioned type with a chassis having its parts so constructed that the trailer may easily and quickly be opened and the boat launched.

Another object of the invention is to provide a trailer having numerous novel fittings and parts which will facilitate the use of the device either as a trailer or a boat.

Other and further objects and features of the invention will more fully appear from the following description in the accompanying drawings and will be particularly pointed out in the claims.

The drawings illustrate in elevation, section, perspective and detail, a preferred form of construction adapted for use in a trailer and embody the broad principles of the invention.

In the drawings.

Fig. 5 is a plan view of the trailer in open or boat position with the rudders, oar locks and motor attached.

Fig. 6 is a side view of the trailer open as shown in Fig. 5, mounted upon the chassis and ready for launching.

Fig. 7 is an elevation of one of the oar lock connecting pins.

Figure 1:
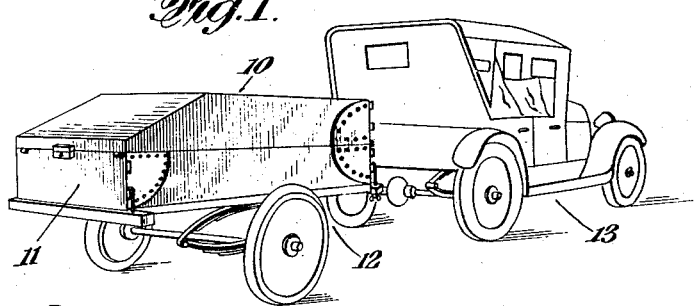
Fig. 1 is a perspective of the trailer in its closed or carrying position attached to an automobile.

As illustrated herein, the trailer consists broadly of a boat comprising two sections, 10 and 11 mounted upon a chassis designated generally at 12 and adapted to be connected in any suitable manner to the rear of an automobile 13, all as illustrated generally in Fig. 1 and more particularly in the other figures of the drawings.

The sections 10 and 11 of the trailer are each a complete boat, but means are provided for detachably connecting them so that when folded together on the chassis they form a completely closed box in which camping equipment may safely be stored and carried under lock and key, and when opened they may be connected together to form a good sized boat capable of carrying a number of persons. The sections of the boat are connected by hinge means consisting of the plates 14 on the forward section 10 of the boat and 15 on the rear section 11 of the boat. The plates carry cooperating and interfitting loops, those on the plate 14 being designated by the numeral 16 and those on the plate 15 being designated by the numeral 17. Pins 18 removably pass through each set of adjacent loops to connect them and form hinges about which the boat sections may swing.

Figure 2:
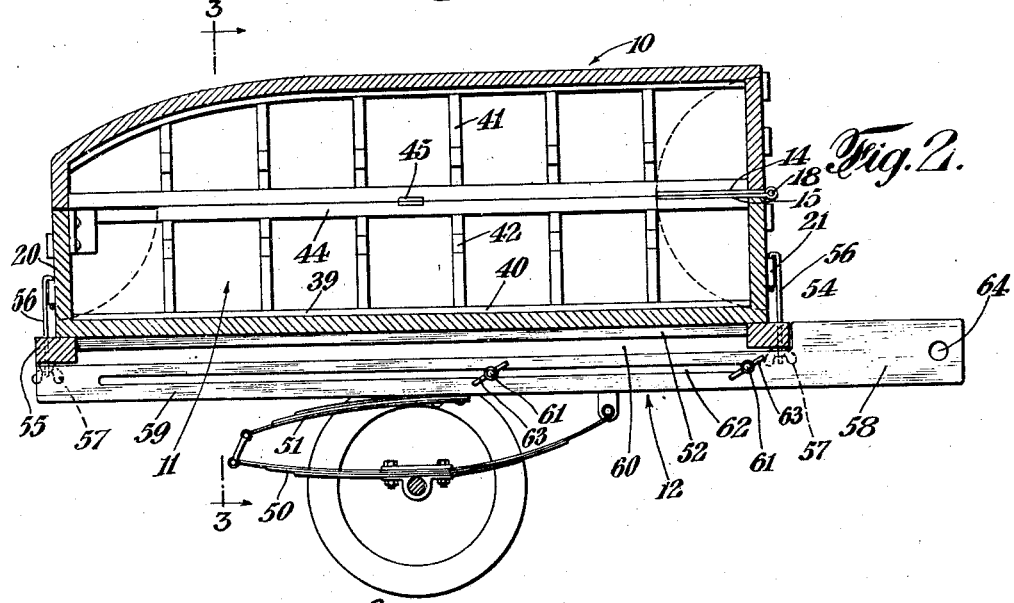
Fig. 2 is a section through the trailer in its closed or carrying position.
Figure 3:
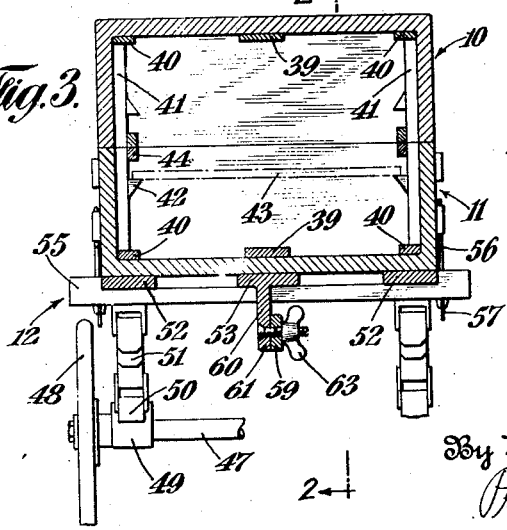
Fig. 3 is a section on line 3—3 of Fig. 2 looking in the direction of the arrows.
Figure 4:
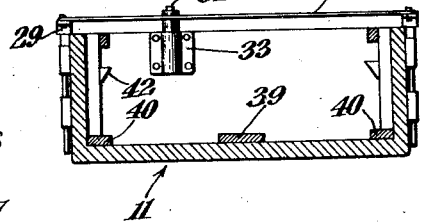
Fig. 4 is a section on line 4—4 of Fig. 5 looking in the direction of the arrows.

The pins 18 are provided with handle portions 19 so that the pins may easily and quickly be removed from the loops when it is desired to separate the boat sections in order to make two boats. The pins are always inserted in the loops with the handles on the inside of the boat so that when the boat sections are folded on each other in the position shown in Fig. 2, the handles are tightly held and thus the opening of the sections by means of withdrawing the pins from the loops, is prevented.

In order to hold the boat sections in line with each other so that a large boat can be made, loops 20 and 21 are provided along the vertical abutting corners of the boat sections and a pin fits through the adjoining loops to prevent the swinging of the boat sections on the horizontal hinges of the plates 14 and 15. Preferably the pins which fit into the vertical loops are the elongated shanks 22 of oarlocks 23. Thus the oarlocks serve to hold the boat sections together and as a result of this arrangement they are positioned at the center of the boat in the most convenient position for use in rowing the boat. The oarlocks and pins 18 may, if desired, be connected by a small chain as illustrated in Fig. 7.

For convenience in building the boat and to strengthen the corners which are required to stand the most of the strain incidental to making the boat ready, the corners of each boat section are reinforced with metal side plates 24 which extend up and over the upper edge of the boat sides to form the top plates 25. The reinforcing plates are held in place by suitable means such as screws or bolts 26. The reinforcing plates may conveniently be made by stamping forms from heavy metal then bending back certain parts to present the loops 16, 17, 20 and 21 and finally bending the stampings to form the side plates 24 and top plates 25.

The rear boat section 11 is provided at its stern with reinforcing plates 24 similar to those used on the rear of the forward section 10 of the boat. The plates have the vertical loops 20 in the same place as are the loops 20 of the plates on the rear of the forward boat section. This is done so that any number of sections similar to the rear boat section 11 may be added in back of each other to make as long a boat as desired.

For the purpose of steering the boat, one or more rudders 27 are provided. Each rudder has pintles 28 so positioned that they fit in each of the loops 20 and when so fitted support the rudder in its proper position. Since the stern of each of the rear boat sections is the same, it is obvious that the rudders may be used on the rear of the assembled boat no matter how many sections the boat contains. A tiller 29 extends forward from each rudder and in order that the rudders may move in unison a connecting bar 30 is provided to connect the forward ends of the tillers. For convenience in steering the boat a handle 31 may be used. The handle may if desired, be pivoted at a point 32 illustrated as a block fastened to the stern of the rear boat section. As illustrated, a portable motor 33 may be fixed to the stern of the rear section of the boat to drive it. Obviously, since the stern portion of the rear boat section 11 is exactly like the stern portion of the forward boat section 10 and any other section, the rudders, connecting bar and handle may be used on the rear of any boat section.

The boat sections themselves are of any suitable construction. In the form illustrated each boat section comprises the sides 34 and the rear ends 35. The rear boat section comprises the vertical and full depth forward end 36 but, in order to lessen the resistance of the boat as it moves through the water, the forward end of the forward boat section is somewhat curved upward as at 37 to form a bow, and has only a short forward end 38. The boat sections are made with the usual center boards 39 and corner strips 40. To strengthen the side of the boat the uprights 41 are used. On each of the uprights 41 is shown a block 42 intended to support a seat 43 which loosely rests upon them. Any other suitable construction may be used for this purpose. The seat can be moved into any position. The upper edge of each boat section is preferably reinforced by a strip 44 which lies outside of the uprights 41.

To allow each boat section to be rowed by means of oars independently of the other, should the sections be used separately, each section is provided with one or more plates 45 having openings 46 therein to receive the shanks of either the usual oarlocks or the oarlocks with the long shanks above described. To accommodate the long shanks the plates are so placed that the openings are above the space between the boat sides and the reinforcing strip 45 so that the long shanks may extend parallel to the uprights 42. These plates are preferably set into the side of the boat sections so that the upper surfaces of the plates are flush with the upper edges of the sides of the boat sections in order that the sections may close tightly on each other when the boat is in folded or carrying position.

As above remarked, the boat is carried on a chassis 12. This chassis includes the running gear and boat supporting frame. The running gear may be of any suitable type, preferably is of such a type and made of such materials that it is not damaged by immersion in water. As illustrated, the running gear comprises the axle 47 which is supported to its ends by the wheels 48. The bearings 49 embrace the axle and by means of any suitable springs 50 and 51 support the frame. The running gear and frame are so made that when the boat is in folded or carrying position on the chassis, the entire trailer is balanced with the wheels carrying all of the weight.

The frame consists of outer longitudinal bars 52 and a central longitudinal bar 53 which are connected by forward and rear cross bars 54 and 55 respectively. The boat is held on the frame of the chassis by any suitable means, preferably bars 56, which are provided with hooked upper ends to catch in the vertical loops 20 and 21 of the lower boat section. The lower ends of the bars 56 pass through openings in the frame pieces and have their lower ends threaded so that wing nuts 57, or any other suitable means, may be used to draw the rods downward and hold the lower boat section immovable against the frame of the chassis.

The tongue 58 of the trailer is preferably so made that it may be extended to facilitate the opening of the boat sections and the launching of the boat. In order to accomplish this, the tongue may be elongated at 59 substantially the full length of the frame of the chassis and the central longitudinal bar 53 may be provided with a depending part 60 which lies besides the elongation of the tongue. Bolts 61 passing through the depending portion of the center frame bar cooperate with a slot 62 in the tongue and the wing nuts 63 so that the tongue may be moved from its retracted position shown in Fig. 2 to its extended position shown in Fig. 6 and retained in either position. In the extended position the tongue supports the forward boat section. An opening 64 in the forward end of the trailer provides means for attaching it to the rear of an automobile by any suitable device.

The trailer is very easy and simple to use. When it is loaded with various camping equipment and attached to the automobile which is to pull it, the parts are in the position illustrated in Figs. 1 and 2 with the lower section of the trailer fastened tightly down against the frame of the chassis by means of the rods 56 and wing nuts 57. The tongue is in its retracted position and held there by the bolts 61 and wing nuts 63 so that the trailer can assume a position quite close to the rear of the automobile in order that it will not take much room on the road and will follow closely in the tracks of the automobile. Upon arriving at the camping ground, the trailer is disconnected from the automobile and unloaded. Then the trailer may be tipped backward so that the wing nuts 63 may easily be reached without getting under the trailer. After the wing nuts 63 are loosened the tongue is drawn into its extended position illustrated in Fig. 6 and after removal of the wing nuts 57 and the rods 56, the upper or forward section 10 of the trailer is revolved about the pins 18 as hinges until it rests on the extended tongue in which position it is held just in line with the rear section of the trailer with all of the loops 20 and 21 in registry. If two boats are desired it is then easy to remove the pins 18 so that the boat sections are disconnected and each may be used as a separate boat. If a large boat is desired it is easy to insert the shanks 22 of the oarlocks 23 through the vertical loops 20 and 21. As above remarked, this holds the boat sections rigidly in line. It is then a simple matter to place the rudders, connecting bar, steering handle, and motor in place after which the entire boat may easily be trundled into the water on the chassis and floated.

I claim:

1. A trailer comprising a chassis, a body including two boat sections connected together and capable of being swung relatively to each other from a closed carrying position to an open boat position, and an extensible trailer tongue on the chassis adapted when extended to support the sections in open boat position.

2. A trailer comprising a chassis, a body including two boat sections hinged together, one removably fastened to the chassis and the other capable of being swung from a closed carrying position to an open boat position, and an extensible trailer tongue on the chassis adapted when extended to support the sections in open boat position.

3. A trailer comprising a chassis, a body including two boat sections connected together and capable of being swung relatively to each other from a closed carrying position to an open boat position, means detachably to connect the sections in open boat position, and an extensible trailer tongue on the chassis adapted when extended to support the sections in open boat position while they are being connected.

4. A trailer comprising a chassis, a body including two boat sections connected together and capable of being swung relatively to each other from a closed carrying position to an open boat position, cooperating rings on the adjacent ends of each section, and a pin for fitting through said rings detachably to connect the sections in open boat position, and an extensible trailer tongue on the chassis adapted when extended to support the sections in open boat position while they are being connected.

5. A trailer comprising a chassis, a body including two boat sections connected together and capable of being swung relatively to each other from a closed carrying position to an open boat position, cooperating rings on the adjacent ends of each section, and an oarlock having a shank for fitting through said rings detachably to connect the sections in open boat position and an extensible tongue on the chassis adapted when extended to support the sections in open boat position while they are being connected.

6. A trailer comprising a chassis, a body including two boat sections each comprising a complete boat, each section having thereon cooperating loops, and a removable pin for fitting in the loops whereby the sections may be detached or swung on the pin and loops as hinges from a closed carrying position to an open boat position.

7. A trailer comprising a chassis, a body including two boat sections each comprising a complete boat, and cooperating means detachably connecting the sections to hold them together and in line to form a single boat.

8. A trailer comprising a chassis, a body including two boat sections each comprising a complete boat, substantially vertical cooperating loops on each section and a removable oarlock having a shank for fitting through the loop sections detachably to connect the sections and hold them in line to form a single boat.

9. A trailer comprising a chassis, a body including two complete boat sections, substantially vertical loops on each corner of one boat section, cooperating loops on the other boat section, a pin removably to pass through the loops to connect the boat sections, and a rudder adapted to be supported on the loops of the first mentioned boat section.

10. A trailer comprising a chassis, a body including two complete boat sections, substantially vertical loops on each corner of one boat section, cooperating loops on the other boat section, a pin removably to pass through the loops to connect the boat sections and a rudder adapted to be supported on each corner of the first mentioned boat section in the loops lying away from the second mentioned boat section.

11. A trailer comprising a chassis, a body including two complete boat sections, substantially vertical loops on each corner of one boat section, cooperating loops on the other boat section, a pin removably to pass through the loops to connect the boat sections, a rudder adapted to be supported on each corner of the first mentioned boat section in the loops lying away from the second mentioned boat section, and means connecting the rudders so that they move in unison.

12. A trailer comprising a chassis, a body including two complete boat sections, substantially vertical loops on each corner of one boat section, cooperating loops on the other boat section, a pin removably to pass through the loops to connect the boat sections, a rudder adapted to be supported on each corner of the first mentioned boat section in the loops lying away from the second mentioned boat section, and means connecting the rudders so that they move in unison, and a tiller for controlling the rudders.

In testimony that I claim the foregoing, I have hereunto set my hand this 7th day of January, 1926.

JOHN H. TEWES.